Figure 1:
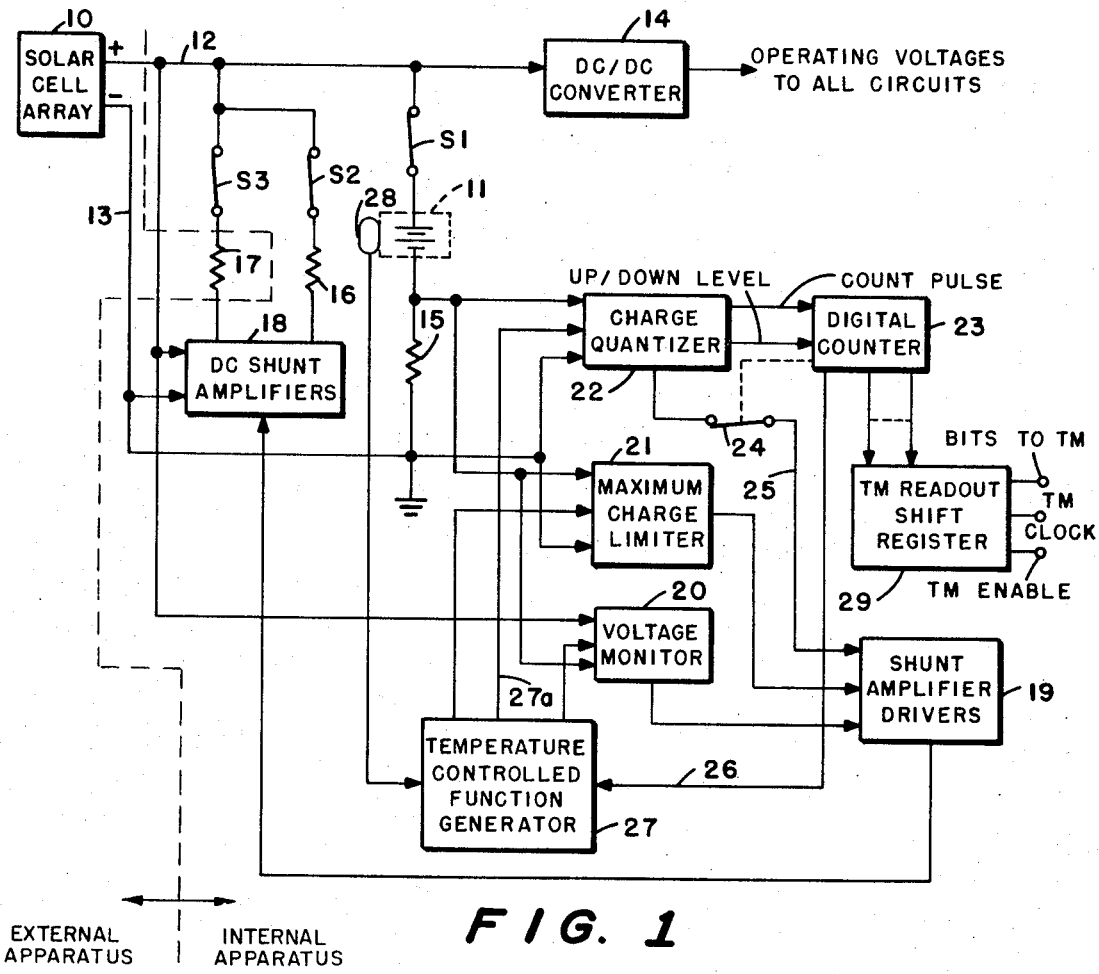

United States Patent [19]

Hogrefe et al.

[11] 3,740,636
[45] June 19, 1973

[54] CHARGE REGULATOR AND MONITOR FOR SPACECRAFT SOLAR CELL/BATTERY SYSTEM CONTROL

[75] Inventors: Arthur F. Hogrefe, Silver Spring; Ralph M. Sullivan, Beltsville, both of Md.

[73] Assignee: The United States of America as represented by the Secretary of the Navy, Washington, D.C.

[22] Filed: Nov. 5, 1971

[21] Appl. No.: 196,029

[52] U.S. Cl. .................... 320/2, 320/35, 320/44, 244/15 C
[51] Int. Cl. ............................................. H02j 7/14
[58] Field of Search .................. 320/44, 48, 39, 40, 320/35, 61, 5, 2; 244/15 C

[56] References Cited
UNITED STATES PATENTS

| | | | |
|---|---|---|---|
| 3,271,652 | 9/1966 | Walz et al. | 320/44 |
| 3,585,482 | 6/1971 | Zelina | 320/39 |
| 3,447,059 | 5/1969 | Ford et al. | 320/39 X |
| 3,600,661 | 8/1971 | Briggs | 320/35 |
| 3,421,068 | 1/1969 | Van Marter | 320/35 X |
| 3,387,199 | 6/1968 | Billerbeck, Jr. et al. | 320/35 X |
| 3,541,422 | 11/1970 | Paulkovich et al. | 320/39 |

Primary Examiner—J. D. Miller
Assistant Examiner—Robert J. Hickey
Attorney—R. S. Sciascia, J. A. Cook and R. J. Erickson

[57] ABSTRACT

An electronic system for providing fully automatic control of a spacecraft solar cell/battery electrical power system, including the provision of continuous telemetry monitoring of the battery charge state. Circuitry accurately measures, on an ampere-minute basis, the charging and discharging of the battery and functions to maintain the battery in a fully charged condition, with a provision for automatic reduction of the charge current to a temperature-dependent trickle value when the proper amount of charge has been returned to the battery after a previous discharge. A bipolar charge quantizer circuit is utilized to monitor battery charge and discharge operations and includes a finite time integrator circuit capable of supplying an output signal pulse each time the battery is charged or discharged by a predetermined amount. The quantizer is designed with a predetermined offset factor to account for battery inefficiency. Temperature dependent maximum battery voltage limiting and maximum charge current limiting are also provided, along with means which operate to automatically shunt excess electrical power from the solar cell array into the spacecraft instrument package in order to provide temperature control therein.

9 Claims, 4 Drawing Figures

Patented June 19, 1973

3,740,636

3 Sheets-Sheet 1

INVENTORS
ARTHUR F. HOGREFE
RALPH M. SULLIVAN

BY

J. A. Cooke

ATTORNEY

CHARGE REGULATOR AND MONITOR FOR SPACECRAFT SOLAR CELL/BATTERY SYSTEM CONTROL

BACKGROUND OF THE INVENTION

A number of control systems have previously been designed for controlling the solar cell/battery electrical power supply utilized aboard spacecraft. Unfortunately, many of these previously proposed systems have been of limited success. For example, previously proposed systems often relied upon the value of battery voltage to indicate the state of battery charge, but it has been found that battery voltage is not a particularly good state-of-charge indicator for the types of batteries commonly used aboard spacecraft. In other words, battery voltage may be dependent upon many factors in addition to the state-of-battery charge, such as, for example, temperature, pressure and battery history. Accordingly, accomplishing battery charge monitoring by sensing battery voltage is rather inefficient and qualitative.

More recently, it has been proposed to utilize a mercury column coulometer to indicate the state or condition of battery charge and discharge, based solely on an ampere hour basis. (See U.S. Pat., No. 3,421,067 issued on Jan. 7, 1969) In this previously proposed coulometer system, current regulating feedback control loops insure that the coulometer is always energized at a fixed fraction of the battery current during both charge and discharge so that the coulometer accurately measures the state of battery charge. The measurement provided by the coulometer is utilized to cause the battery to be charged at the maximum available current rate until a charge exactly equal to a previous discharge has been accomplished. Additionally, the coulometer detects when the spacecraft battery has been returned to its fully charged condition and automatically reduces the charging current to a predetermined trickle value at which the battery can be safely charged continuously.

In the general field of spacecraft battery/solar cell array system monitoring and control, it has also been previously proposed to utilize finite time integrating circuit means for monitoring the amount of charge being supplied to the battery by the spacecraft solar cell array. More specifically, the finite integrator circuitry was utilized to produce an output signal pulse each time the battery had been charged by a predetermined amount. The output pulses generated by the finite time integrator were supplied to a digital accumulator or counter and subsequently interfaced into the spacecraft telemetry system.

SUMMARY OF THE INVENTION

It is proposed in accordance with the present invention to provide an all electronic charge regulating and monitoring system particularly adapted for use aboard space-craft in conjunction with a battery/solar cell array type electrical power system. The proposed system includes a bipolar charge quantizer incorporating a finite time integrator circuit which responds to an integrates the battery current during both charge and discharge operations. Polarity sensing circuitry is included in the charge quantizer to sense whether the battery is being charged or discharged and produce a corresponding voltage signal level control output. The count signal pulses and the charge/discharge indicating voltage level from the bipolar charge quantizer are applied to and control a reversible digital accumulator or counter which counts the output pulses in one direction during battery charging and in the opposite direction during battery discharging. Accordingly, the digital counter or accumulator resisters a count which is at all times indicative of the state of battery charge. The pulse count registered by the digital counter is interfaced into the spacecraft telemetry system and is transmitted to a remote receiving station and thereby provide, on the ground, an accurate indication of spacecraft battery condition.

In accordance with the present invention, the spacecraft equipped with the proposed charge regulating and monitoring system includes circuitry which functions to shunt the electrical energy output from the solar cell array in excess of the amount needed to maintain the battery fully charged away from the battery and dissipate such excess energy, as heat, at one or more resistance elements formed, for example, as a winding(s) distributed on the solar cell blade(s) of the spacecraft. The proposed system of the present invention also includes a similar distributed resistance element located internal to the spacecraft, on the instrument panel for example, which is energized with excess current from the solar cell array dependent upon the temperature within the spacecraft so as to provide temperature control therein, as will be explained in more detaile hereinafter.

The maximum charging current value from the solar cell array to the battery is limited in the proposed system to a predetermined safe level such as, for example, four amperes and is selected to assure that the battery, once discharged, is quickly returned to its fully charged condition, while at the same time preventing excessive charge from being applied to the battery. Additionally, suitable voltage monitoring circuitry is connected to the power line or bus leading from the solar cells to the battery and is effective to cause a shunting of solar cell output current away from the batteries and into the distributed resistances (external and/or internal) discussed above when the detected voltage level increases above a predetermined value. As previously mentioned, the current through these shunting resistances is also controlled in accordance with the state of the battery charge, as indicated by the count pulse output from the charge quantizer portion of the proposed system; i.e., when the battery is detected as being in a fully charged condition, the charging current available at the solar cell array output is shunted away from the batteries, except for a preselected trickle current value.

Novel temperature controlled function generating circuitry is also provided in the proposed system of the present invention and is effective to render the voltage sensing portion of the circuitry dependent upon the ambient temperature of the battery inasmuch as the proper maximum voltage level for the battery is, as is well-known, a function of ambient temperature. Moreover, the proper value of trickle charge current for the battery is also dependent upon battery temperature and accordingly, the temperautre controlled function generating circuitry proposed in accordance with the present invention is also utilized to select or adjust the value of the trickle charge current to the battery.

In view of the foregoing, one object of the present invention is to provide an improved system for monitoring and controlling an electrical power system such as is employed, for example, on spacecraft.

Another object of the invention is to provide an improved system for monitoring and controlling a spacecraft solar cell/battery electrical power system.

Another object of the invention is to provide an improved system for accurately monitoring the amount of charge and discharge to which a battery is subjected and utilizing bidirectional charge quantizer circuitry to detect battery charge/discharge in combination with a reversible digital counter.

A further object of the invention is to provide a system for monitoring battery charge/discharge and including the complementary features of temperature dependent over voltage limiting, maximum allowable current charge limiting, and temperature dependent trickle charging.

A still further object of the invention is to provide a system for monitoring and regulating a spacecraft solar cell/battery electrical power system wherein excess charging energy is utilized, as necessary, to provide temperature control internal to the spacecraft.

Figure 3:
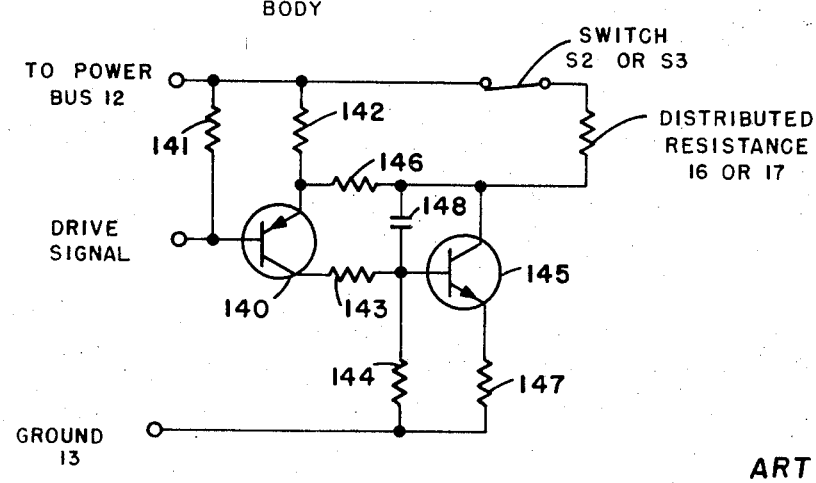
Figure 2A:
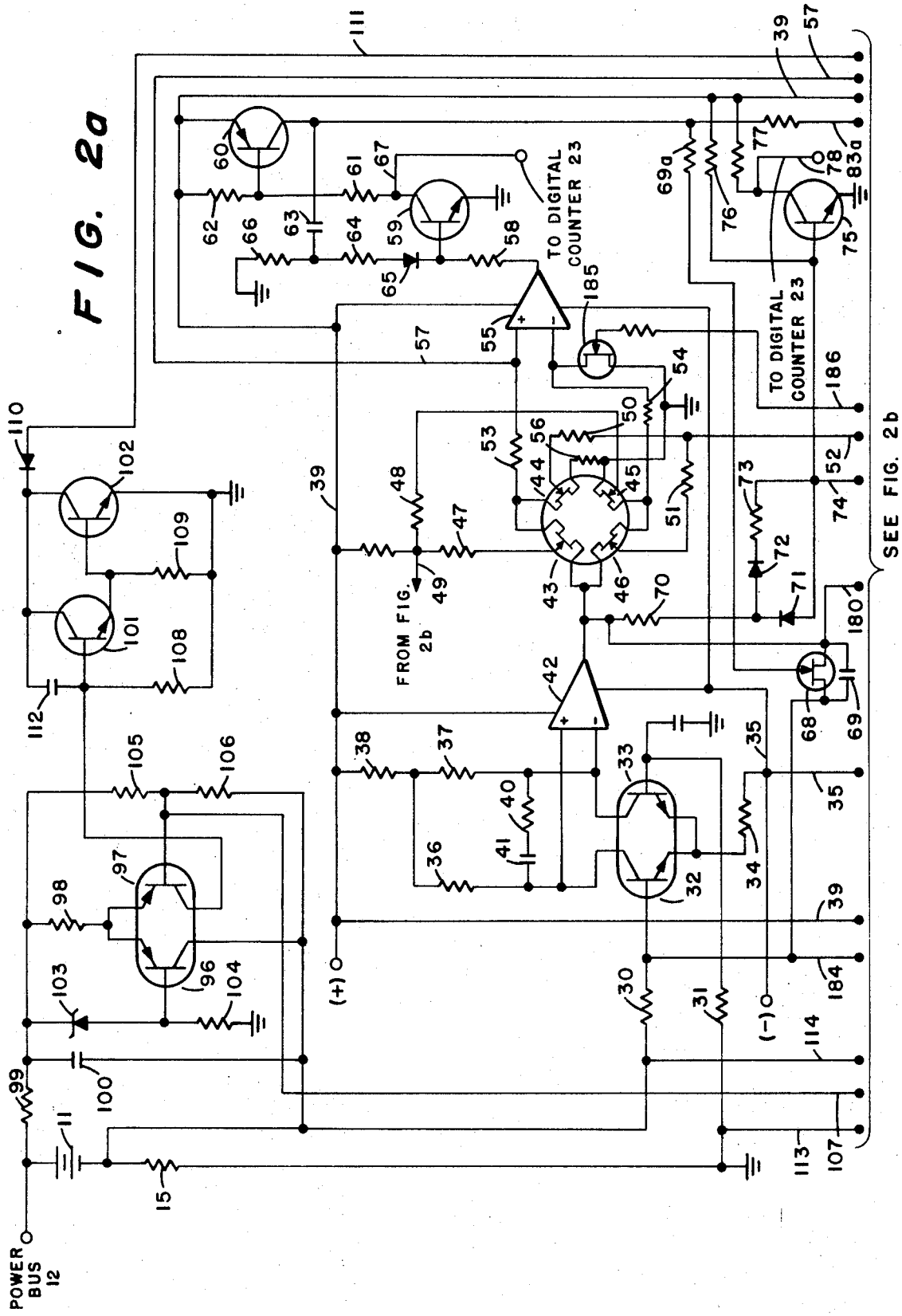
Figure 2B:
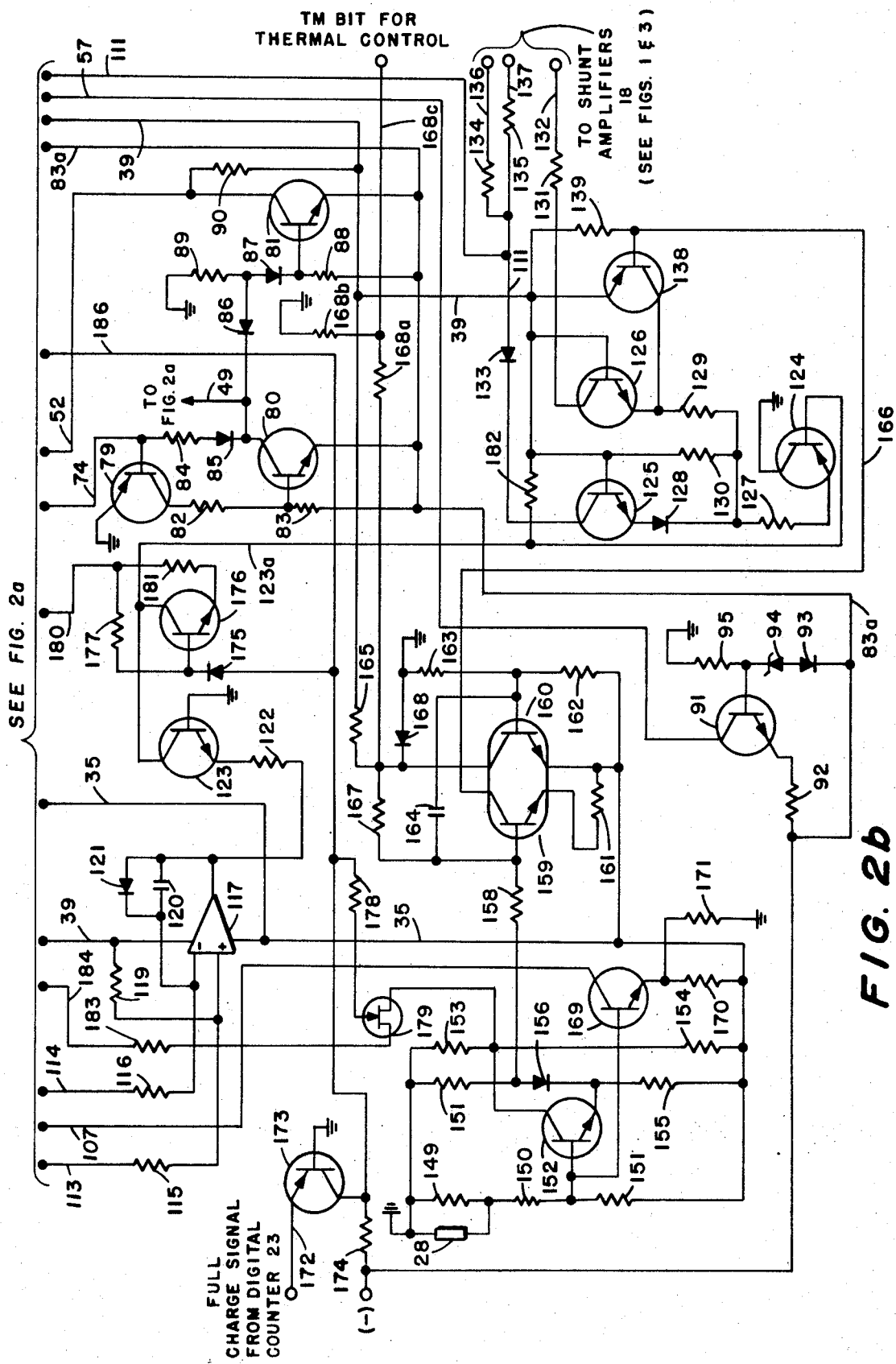

Other objects, purposes and characteristic features of the present invention will in part be pointed out as the description of the present invention progresses and in part be obvious from the accompanying drawings, wherein:

FIG. 1 is a simplified block diagram of one embodiment of the proposed charge regulating and monitoring system of the present invention, as applied to a spacecraft solar cell/battery electrical power system;

FIGS. 2a and 2b when placed one above the other with FIG. 2a on top constitutes a schematic diagram of detailed circuitry employed in the illustrated embodiment of the proposed charge regulating and monitoring system; and FIG. 3 is a detailed schematic diagram of D.C. shunt amplifier circuitry utilized in the illustrated embodiment of the present invention.

Referring to the block diagram of FIG. 1, the solar cell array is designated at 10 and is connected to the spacecraft battery 11 via power bus line 12 and ground line 13. The array 10 is also connected, via power bus 12, to suitable D.C./D.C. converter circuitry 14 which converts the D.C. voltage output from the solar cell array 10 into the varius operating voltages needed by the spacecraft-carried electronics. The battery 11 can be of any conventional type such as, for example, a multi-cell nickel-cadmium battery commonly used on present day satellites and other spacecraft. Connected in series with the battery 11, between the power bus line 12 and ground 13, are command control switch S1 and monitoring resistor 15 across which is generated a voltage signal proportional to battery charge/discharge current. The command control switch S1 is preferably capable of being remotely controlled from a ground station and functions to disconnect the battery 11 from the power bus 12 in the event that battery voltage drops below some predetermined level.

Also connected to the power bus line 12, through series switches S2 and S3 respectively, are resistance elements 16 and 17. The resistance 16 might, for example, be a small value (e.g., 4 ohm) distributed resistance winding mounted on the instrument panel within the spacecraft; whereas, resistance 17 might be one or more similarly sized resistance windings distributed on the solar cell blades external to the spacraft, for purposes to be described in detail hereinafter. The values of current supplied through the resistances 16 and 17 are controlled by D.C. shunt amplifiers 18 (to be described) which are, in turn, controlled or driven by suitable shunt amplifier driver circuitry 19 dependent upon a plurality of control signals received from battery voltage monitor network 20, maximum charge current limiter network 21 and charge quantizer 22.

More specifically, the battery charge and discharge current monitored across resistor 15 is applied as a proportionate voltage signal input to the charge quantizer 22 where, as will be discussed in detail, this voltage is integrated by an operational amplifier circuit until a predetermined detection level is reached, at which time a bi-polar detector circuit fires, the integrating amplifier resets, and a count pulse is sent to a reversible or up-down digital counter or accumulator 23. At the same time that this quantization process is taking place, a polarity detector circuit within the quantizer 22 monitors the integrator output and provides a voltage level to the counter 23 indicating whether the associated count pulse should be added to or subtracted from the existing counter contents; i.e., the voltage level furnished by the polarity detector indicates whether the battery is being charged or discharged so as to properly control the counting direction of counter 23. As a result, the count registered at 23 is always an accurate indication of the state of battery charge. As will be described in detail hereinafter when discussing the illustrated circuitry of FIGS. 2a and 2b, the operation of the quantizer circuit 22 may, if desired, involve an offset factor to account for battery inefficiency during charging. In other words, a somewhat greater charging ampere/minute quantity is required to produce an output count pulse than is necessary to produce a count pulse during discharge.

When the digital counter 23 indicates, by its registered count, that the battery 11 is in a fully charged condition, the charge quantizer 22 is connected to the shunt amplifier drivers 19, as represented by the closure of switch 24 in control line 25 of FIG. 1, and a "full charge" signal control is applied, as represented by control line 26, to a temperature controlled function generating network designated at 27. The function generator network 27 responds to the ambient temperature of the battery 11 as sensed, for example, by thermistor 28 suitably attached to the battery casing (e.g., by epoxy). The purposes of these signal controls representing a fully charged battery 11 are to (a) cause the shunt regulating resistances to be driven from the integrating operational amplifier and thereby shunt excess energy from the solar cell array to the resistance elements 16 and 17 where such energy may be dissipated, and (b) connect the circuitry in the trickle charge mode wherein the input to the integrating operational amplifier is offset by the trickle charge required. This trickle offset control is temperature dependent, as mentioned previously, and is represented in the block diagram of FIG. 1 by the control line 27a.

The maximum charging current limiter network 21 also receives the proportionate voltage signal developed across the monitoring resistor 15. As will be described in more detail hereinafter, the limiter circuitry 21 responds to this proportionate voltage signal and controls the shunt amplifier drivers 19 to maintain the maximum charging current into the battery, from the solar cell array 10, at some predetermined safe value such as, for example, 4 amperes.

Voltage monitoring network 20 is connected between the power bus line 12 and the top of monitoring resistor 15 to measure the level of voltage existing at the input to battery 11 and to cause a shunting of energy from the solar cell array 10 away from the battery 11, by proper control of the shunt amplifier drivers 19, as necessary to prevent the battery voltage from exceeding a predetermined value. The over-voltage control thus provided by circuitry 30 is also made preferably temperature dependent, inasmuch as the proper value of voltage for battery 11 varies as a function of the ambient temperature of the battery that is sensed by thermistor 28.

As mentioned previously, the count stored in digital counter 23 provides an accurate registration indicative of the state of battery charge and is interfaced into the spacecraft telemetry system at the proper time and rate by means of a suitable read-out shift register 29, under the control of suitable telemetry clock and enable signals received from the telemetry apparatus. By way of example, in one practical application of the proposed system of the present invention, an eight-bit shift register is utilized to provide telemetry read-out of battery state-of-charge, with a most significant bit resolution of ± 0.5 percent. This degree of accuracy enables the ground control station to obtain an accurate read-out on the operation of the spacecraft electrical power system and of the proposed regulating and monitoring apparatus of the present invention. In addition, as will be described in more detail hereinafter, a suitable telemetry "flag" bit is provided in accordance with the present invention to enable the ground control station to monitor functioning of the thermal control portion of the system of the present invention; i.e., that portion of the present invention which provides temperature control within the spacecraft; e.g., adjacent the instrument package, by routing solar cell output energy to the internal distributed resistance 16 when excess current is available at the output from the array 10.

Referring now to the detailed schematic diagram of FIG. 2a, the voltage signal proportionate to battery charge/discharge current, as developed across monitor resistor 15, is applied through equal value resistors 30 and 31 to the bases of NPN transistors 32 and 33 respectively connected in a conventional differential amplifier circuit configuration. The emitters of the differential amplifier pair 32–33 are connected together and through common resistor 34 to a negative operating voltage (−) on line 35. The collectors of the transistor pair 32–33 are connected through resistors 36 and 37 respectively to one side of a common resistor 38, the other side of which is connected to a positive operating voltage (+) appearing on line 39 that extends between FIGS. 2a and 2b. Resistors 36 and 37 are unbalanced to operate transistors 32–33 in a null state of equal base to emitter voltages (which produces better temperature tracking than equal collector currents). The series RC circuit 40–41 extending between the collectors of transistors 32–33 form a lead/lag network used to stabilize the control loop; i.e., modify the AC gain/phase characterstic, and resistor 38 provides a common mode voltage drop to allow interface with the following integrated operational amplifier 42.

More specifically, the outputs from this matched differential amplifier pair (the collectors of transistor stages 32 and 33) are connected to the input of a suitable monolithic type amplifier 42 which, together with matched pair 32–33, constitutes an operational amplifier stage possessing excellent temperature tracking and high gain properties. The amplifier 42 receives its operating voltages from lines 35 and 39, as shown, and its output is applied to a double pole, double throw switching network formed by four field effect transistors 43, 44, 45, and 46 connected as shown in FIG. 2a. More specifically, the gate elements of the field effect transistors 43 and 45 are connected through resistors 47 and 48 respectively to control line 49 extending between FIGS. 2a and 2b; whereas, the gate elements of the field effect transistors 44 and 46 are connected through resistors 50 and 51 respectively to control line 52 extending between FIGS. 2a and 2b. The drain-source elements of the field effect transistor 43 are connected between the output from the amplifier 42 and the left-hand end of resistor 53; whereas, the drain-source elements of field effect transistor 46 are connected between the output of amplifier 42 and the left-hand end of an equal value resistor 54. The right-hand ends of the resistors 53 and 54 are connected to the inputs of a monolithic amplifier 55 which, as will be described in more detail hereinafter, is operated as a comparator circuit. The source-drain element of the remaining two field effect transistors 44 and 45 are connected between the left-hand ends of resistors 53 and 54 respectively and ground; the connection of the left-hand end of resistor 53 to ground by field effect transistor 44 being effected through a resistor 56 which has a resistance value selected in accordance with a desired offset factor, to be described in detail hereinafter, that accounts for inefficiency of the spacecraft battery 11 during charging.

The non-inverting input of the comparator 55 (e.g., the right-hand end of resistor 53) is off-set relative to the other or inverting comparator input, when the battery 11 is being charged, by a predetermined negative voltage level developed across resistors 53 and 56 due to a control signal current supplied along line 57 in FIGS. 2a and 2b, as will be described in detail hereinafter. Accordingly, when the inverting input to the comparator 55 (at the right-hand end of resistor 54) goes negative by an amount at least equivalent to this offset at the other input terminal to comparator 55, as occurs, for example, during charging of the battery 11, a positive output signal is produced by the comparator circuit 55 and is coupled, through resistor 58, to the base of NPN transistor 59 which, together with PNP transistor 60, forms a conventional pulse amplifier circuit. More specifically, the emitter of transistor 59 is grounded, and the collector is connected through series resistors 61 and 62 to the positive operating voltage supply line 39. The base of the second transistor 60 in this pulse amplifier circuit is connected to the junction between resistors 61 and 62; whereas, the emitter of transistor 60 is connected directly to the positive operating voltage line 39 and the collector of transistor 60 is connected through capacitor 63, resistor 64 and diode 65 to the base of transistor 59 and thereby provide regenerative feedback between these two transistors. The junction of feedback capacitor 63 and resistor 64 is connected to ground through resistor 66. Each output pulse produced at the collector of the transistor stage 59 is applied, over line 67, as one input (designated as the "count pulse") to the reversible digital counter 23 shown in FIG. 1 of the drawings.

Connected between the base of transistor 32 (in the differential amplifier pair previously described) and the output of the operational amplifier 42 is a parallel combination of a field effect transistor 68 and capacitor 69 which function, together with the circuitry previously described, to form a finite time integrator which detects each time a predetermined level of charge or discharge has been added to or subtracted from the battery 11. More particularly, the integrating capacitor 69 is charged in accordance with the voltage level developed across the battery current monitoring resistor 15 until the comparator 55 detects that the integrated value of battery charge/discharge current; i.e., the amount of charge/discharge to or from the battery 11, has reached a predetermined ampere-minute level. Each time this occurs, the pulse amplifier circuitry 59–60 is triggered so as to produce a positive voltage signal at the collector of transistor 60 which is coupled to the gating element of the field effect transistor 68 through resistor 69a, thus causing the field effect transistor 68 to conduct and short out (reset) the integrating capacitor 69. As a result, the pulse amplifier circuitry 59–60 outputs, at the collector of transistor 59, one pulse of predetermined shape each time the battery 11 either receives a predetermined level of charge from the solar cell array or has been discharged by an equivalent amount. During the discharge operation, the double pole, double throw switching circuit formed by the four field effect transistors 43 through 46 switches state due to the control signal on control line 49, so that field effect transistors 43 and 45 are conducting; whereas during battery charge, the field effect transistors 44 and 46 were turned on by the control signal on line 52.

The output of the operational amplifier 42 (in the finite time integrator) is also connected, through resistor 70, to the junction of oppositely poled diodes 71 and 72, the second of which is serially connected to a resistor 73. Accordingly, depending upon the polarity of the integrator output; i.e., whether the battery 11 is being charged or discharged, opposite polarity voltage signals may appear on line 74 between FIGS. 2a and 2b. During charge, for example, a negative voltage level will appear on line 74 and during discharge the voltage on line 74 will be positive. As shown in FIG. 2a, line 74 is connected, on the one hand, to a grounded emitter transistor stage 75, whose base and collector are also connected through resistors 76 and 77 respectively to the positive operating supply voltage on line 39. When the spacecraft battery 11 is being charged, the resulting negative voltage signal at line 74 keeps transistor stage 75 in an off or non-conducting state and therefore a positive voltage level appears on the output line 78 extending to the digital counter 23. On the other hand, when the battery 11 is being discharged, transistor stage 75 is turned on by the positive voltage signal at line 74 and the output level appearing on line 78 is therefore reduced to ground or zero voltage level. The voltage level appearing on output line 78 provides the control for the digital counter 23 necessary to determine in which direction each count pulse appearing on line 67 should be counted. Accordingly, in FIG. 1, the voltage level appearing on output line 78 of FIG. 2a is that designated as the "up/down level."

As mentioned previously the input connections to the comparator stage 55 are controlled by the four stage field effect transistor switching bridge 43–46. The switching state of this FET bridge is, in turn, controlled by a polarity sense circuit comprising transistor stages 79, 80, and 81 in FIG. 2b. More specifically, the emitter of transistor stage 79 is grounded and its collector is connected by series resistors 82 and 83 to a negative operating voltage level on line 83a. The base of transistor 79 is connected to receive the charge/discharge indicating voltage level on line 74 and, through resistor 84 and serially connected diode 85, to the collector of transistor stage 80. The base of transistor stage 80 is connected between the junction of resistors 82 and 83 and the emitter is connected directly to the negative operating voltage line 83a. The collector of transistor stage 80 is also connected to control line 49 extending between FIGS. 2a and 2b and, through diodes 86 and 87 to the base of transistor stage 81. The base of this transistor stage 81 receives its biasing voltage from a voltage divider network comprising series resistors 88 and 89 connected on opposite sides of the diode 87; whereas, the operating voltages from the emitter and collector of transistor stage 81 are supplied respectively by a direct connection of the emitter to the negative operating voltage line 83a and by a connection of the collector through resistor 90 to the positive operating voltage line 39. The collector of transistor stage 81 is also connected, via control line 52 in FIGS. 2a and 2b, to the gating elements of field effect transistors 44 and 46 of the switching bridge 43–46.

When the battery 11 is being discharged, the positive control voltage resulting on line 74 functions to control transistor stages 79 and 80 to their off or non-conducting states; whereas, transistor stage 81 is turned on. Accordingly, a positive control voltage signal appears on line 49 to turn on the field effect transistor pair 43–45 and a negative control voltage signal appears on control line 52 to maintain field effect transistor pair 44–46 in a non-conducting state. As mentioned previously, this switching state for the field effect transistor switching bridge circuitry of FIG. 2a connects the left-hand end of resistor 54 to ground and the left-hand end of resistor 53 to the output of the integrating operational amplifier stage 42. On the other hand, when the battery 11 is being charged and a negative control voltage therefore appears on line 74 (at the output of integrating operational amplifier 42), the transistor pair 79 and 80 is turned on and transistor 81 is turned off. The control line 49 now receives a negative voltage level; control line 52 receives a positive control voltage signal from the supply line 39 and resistor 90; and, switching circuit 43–46 is now switched to the operating state wherein the transistor pair 44–46 is turned on and the transistor pair 43–45 is turned off. This reverses the connections at the input of the comparator amplifier 55; i.e., the left-hand end of resistor 53 is grounded through field effect transistor 44 and resistor 56 and the left-hand end of resistor 54 is connected through field effect transistor 46 to the integrator output.

The offset voltage to the comparator circuit 55, whereby the over-all integrator circuitry is controlled to operate with a predetermied finite operating time, is applied along control line 57 between FIGS. 2a and 2b and is generated at circuitry including NPN transistor stage 91 in FIG. 2b. More particularly, collector of transistor 91 is connected to the control line 57, its emitter is connected through resistor 92 to the negative operating voltage line 83a, and its base is biased at a preset negative voltage level by the series circuit comprising diode 93, zener diode 94 and resistor 95 connected between supply line 83a and ground. The result is a predetermined negative offset voltage level which is applied over line 57 to the non-inverting input terminal for the comparator stage 55 and which is preselected, as necessary, to account for the less than 100 percent efficiency of the battery 11 during a charging operation.

The reversible digital counter 23 (see FIG. 1) receives a count pulse from the finite time integrating circuitry described above each time a predetermined amount of electrical charge has been added to or substrated from the battery 11. The counter 23, in turn, registers a corresponding count code which indicates continuously the state of battery charge, with the up/-down control voltage level (e.g, a positive five volts or zero volts on line 78 in FIG. 2a) determining the counting direction for the counter 23. The code contents of digital counter 23 can, as desired, then be shifted to the read-out shift register 29 and subsequently communicated to a ground control station, for example, over the usual spacecraft telemetry link and thereby keep the ground station accurately and continuously informed as to the condition of the battery 11. As will be discussed in more detail hereinafter, the count registration provided by the dititally counter 23 is also utilized to initiate a shunting of solar cell array output energy away from the battery 11 when the battery 11 is in a fully charged condition.

The voltage level at the input to the battery 11 is continuously monitored and utilized to provide an additional control of the energy supplied from the solar cell array 10 of FIG. 1 to the battery 11. Thus, connected between the power bus 12 and the upper end of the current monitoring resistor 15 of FIG. 2a is a voltage monitoring circuit formed by a transistor pair 96 and 97 connected in a conventional differential amplifier circuit configuration. The emitters of the transistors 96 and 97 are connected to the power bus line 12 by means of a common resistor 98 and series input resistor 99. Filter capacitor 100 is connected between the junction of resistors 98 and 99 and the upper end of the current monitoring resistor 15. The collector of transistor stage 96 is also connected to the upper end of the monitoring resistor 15; whereas, the collector of the right-hand stage 97 is connected to suitable current amplifying circuitry comprising transistor stages 101 and 102, to be described in more detail hereinafter.

A predetermined reference voltage level for the differential amplifier pair 96–97 is generated by a zener diode/resistor series circuit 103–104 extending between the junction of resistors 98 and 99 and ground. This reference voltage appears at the base of the transistor stage 96. On the other hand, the base of the transistor stage 97 receives a voltage level dependent upon the voltage across the battery 11 by means of a voltage divider network formed of resistors 105 and 106. The base of transistor 97 is also connected to control wire 107 extending between FIGS. 2a and 2b for the purpose of rendering operation of the voltage monitoring circuitry dependent upon the ambient temperature of the battery 11, as will be discussed in more detail hereinafter.

When the voltage across the battery 11 decreases below its desired value, a corresponding increase occurs in the voltage level applied to the base of transistor stage 97. This results in a decreased or less positive voltage level appearing at the output of transistor 97 (at its collector) for coupling to the base of NPN transistor stage 101 in the current amplifying circuitry; i.e., with reduced conduction by transistor 97, a less positive voltage level is developed across the resistance 108 connected between the base of transistor 101 and ground. Transistor 101 therefore conducts less and produces a less positive voltage input level across resistor 109 between the base of transistor 102 and ground, so that this latter transistor also conducts less.

The collectors of transistors 101 and 102 are connected together and control the amount of current drawn through diode 110 and along control line 111 which extends between FIGS. 2a and 2b and finally to the shunt amplifiers designated at 18 in FIG. 1 (see typical circuit shown in FIG. 3). Feedback capacitor 112 interconnects the collector and base of transistor stage 101.

When transistor stages 101–102 are controlled to a reduced conduction state as just described; i.e., due to a low battery voltage, a lesser current is drawn through the diode 110 and results in a more positive voltage drive signal being applied over line 111 to the shunt amplifier circuitry typically illustrated in FIG. 3, as will be discussed in more detail hereinafter. This, in turn, causes a decrease in conduction by the transistor stages constituting the shunt amplifiers so that less of the current available from the solar cell arrays 10 is shunted away from the battery 11; i.e., more of the solar cell array output energy is applied to the battery 11.

Conversely, when the battery voltage increases above its desired or nominal value, the right-hand side (transistor stage 97) of the differential amplifier pair 96–97 increases its conduction and produces a more positive voltage level across the base input resistor 108 for transistor stage 101, thus resulting in increased conduction at transistor stages 101 and 102. As a result, more current is drawn through control diode 110 to produce a more negative drive signal at the input to the shunt amplifier circuitry. This in turn, causes an increased shunting action of the energy from the solar cell array 10 away from the battery 11 and into the internal/external shunting resistances 16–17.

That portion of the proposed charge regulating and monitoring system of the present invention which limits the maximum current at which the spacecraft battery 11 is charged from the solar cell array 10 is shown in FIG. 2b and responds to the voltage developed across monitoring resistor 15 proportional to exist battery charge (or discharge) current. This voltage appears on lines 113 and 114 between FIGS. 2a and 2b and is applied, through equal value resistors 115 and 116, to the opposite polarity inputs of a suitable operational amplifier stage 117 which receives its operating voltages via positive supply voltage line 39 extending between FIGS. 2a and 2b and negative supply line 35 extending to a negative supply voltage (−). The lower or non-inverting input for the operational amplifier 117 is also connected to the positive operating voltage line 39 via a resistor 119 to produce a desired offset voltage level (e.g., 200 millivolts) at the input to amplifier 117 corresponding, for example, to a maximum charging current of 4 amperes flowing through a monitoring resistor 15 having a resistance value of 0.05 ohms. A feedback capacitor 120 is connected across the output/input of the operational amplifier stage 117 to provide a low frequency roll-off and insure stable operation under closed-loop conditions; whereas, a parallel-connected diode 121 is utilized to prevent the occurrence of positive output voltage levels more than some predetermined minimal value such as 0.8 volts in order to eliminate the need for a bipolar feedback capacitor.

Should the charging current to the battery 11 increase above the desired maximum value of four amperes, the positive voltage level appearing at the upper or inverting input to the operational amplifier 117 overcomes the offset level for amplifier 117 and results in a negative voltage signal at the output of the amplifier 117. This output signal is applied, through resistor 122, to the emitter of an NPN transistor stage 123, thus turning this transistor stage on. A negative control voltage therefore appears at the collector output of the stage 123 and is coupled over line 123a to the base of shunt amplifier driver transistor stage 124 which, as a result, is actuated to its conducting state.

The emitters of two transistors stages 125 and 126 are connected to the output or emitter of stage 124 by a common resistor 127 and by diode 128 and resistor 129 respectively. The bases of transistor stages 125-126 are each connected to receive the positive operating voltage appearing on line 39, with the base of transistor 125 also being connected by resistor 130 to the junction of resistor 127 and diode 128. The collector of the transistor stage 126 is connected through resistor 131 to output drive control line 132 which leads to and controls the D.C. shunt amplifier circuitry associated with the internal distributed resistance element shown at 16 in FIG. 1. On the other hand, the collector of transistor stage 125 is connected, via diode 133, to the drive control line 111 which, in turn, is connected to and controls the shunt amplifier circuitry associated with the external distributed resistance(s) designated at 17 in FIG. 1. By way of example, the drive signal output produced on control line 111 by conduction of transistor 125 might be applied through the illustrated resistors 134 and 135 to a pair of control lines 136 and 137 leading to shunt amplifier circuitry for two separate resistance elements distributed external to the spacecraft on two solar cell array panels. As mentioned previously, the shunt amplifier circuitry associated with each of the external/internal distributed resistances is typically illustrated in FIG. 3 of the drawings to be described in more detail hereinafter.

When transistor stage 124 is driven to a conducting state, as happens for example when the battery charging current exceeds the desired maximum value of four amperes, a less positive voltage signal appears at the emitter of transistor stage 124; thereby creating a circuit condition wherein transistor stages 125 and 126 may conduct. However, the diode 128 in the emitter circuit of transistor stage 125 insures that transistor stage 126 will turn on prior to transistor stage 125, so that preferably the excess charging energy available from the solar cell array 10 is shunted away from the spacecraft battery 11 and utilized to energize the resistance (designated at 16 in FIG. 1) which is distributed internal to the spacecraft on the instrument panel, for example, for the temperature control purposes previously discussed. A transistor stage 138 is connected in parallel with the transistor stage 126 for the purpose of shorting out transistor stage 126 when the ambient temperature of the instrument panel exceeds some predetermined level, as sensed by the thermistor 28 (see FIGS. 1 and 2b) mounted on the battery case adjacent the instrument panel, for example, More specifically, the emitter of the PNP transistor stage 138 is connected to the positive operating voltage line 39, its collector is connected directly to the emitter of transistor stage 126 and its base is connected, on the one hand, to the voltage supply line 39 through resistor 139 and, on the other hand, to the temperature controlled function generating circuitry (designated at 27 in FIG. 1) to be described in detail hereinafter which renders operation of the transistor stage 138 dependent upon the temperature sensed by the thermistor 28.

As mentioned previously, FIG. 3 of the drawings illustrates a typical D.C. shunt amplifier circuitry associated with the distributed resistances 16 and 17 (see FIG. 1) that are mounted in parallel across the solar cell array 10 and battery 11 and shunt excess energy away from the battery for the purposes of preventing the battery 11 from being over-charged, maintaining proper battery voltage, and limiting maximum battery charge current. This typcial D.C. shunt amplifier circuitry of FIG. 3 is connected between the power bus 12 and system ground 13 and includes a control transistor stage 140 which responds to the drive signal received over the associated drive control line, such as 132, 136 or 137 in FIG. 2b. In other words, one of the typical circuits of FIG. 3 is associated with each of the distributed internal and external resistance elements represented as 16 or 17 in FIGS. 1 and 3. The transistor stage 140 comprises a PNP type transistor whose base is connected to the drive control line to receive the drive signal. The base of the transistor 140 is also connected by resistor 141 to the power bus 12. The emitter of the stage 140 is connected to the power bus 12 by resistor 142; whereas, the collector is connected through resistors 143 and 144 to ground. The base of an NPN transistor stage 145 is connected to the junction of resistors 143 and 144 so that conduction through transistor 145 is dependent upon control transistor 140. The collector of transistor 145 is connected, on the one hand, through resistor 146 and resistor 142 to the power bus 12 and, on the other hand, to one end of the sassociated distributed resistance element 16 or 17, as shown in FIG. 3 (see also FIG. 1). The emitter of transistor stage 145 is connected to ground through resistor 147. Feedback capacitor 148 interconnects the collector and base of transistor stage 145.

Assume, for example, that the battery charging current exceeds the desired maximum value of 4 amperes and therefore the transistor stages 123, 124 and 126 of FIG. 2b are made to conduct, as previusly described. As a a result, a current flow occurs from right to left along line 132 (assuming conventional current) which is represented, in FIG. 3, by the designation "drive signal". The positive base voltage for control transistor 140 would therefore decrease and cause a corresponding increase in the conduction at this transistor stage. The voltage appearing at the junction of resistors 143 and 144 would thus increase in a positive direction, thus increasing conduction at transistor stage 145 and causing more of the current available on power bus line 12 (at the output of the solar cell array 10) to be diverted or shunted away from the spacecraft battery 11 and into the internally distributed resistance 16 (or external resistance 17). As soon as the charging current to the battery is thereby reduced below the desired level of 4 amperes, the drive signal for the base of transistor stage 140 would automatically be removed.

As noted earlier, the NPN transistor stage 138 is connected across the base-emitter of transistor stage 126 for the prupose of shorting out this latter stage when sufficient current has been shunted to the internally distributed resistance 16 to raise the ambient temperature for the instrument package above some predetermined temperature level such as, for example, 55° F. The ambient temperature of the spacecraft's instrument package is detected by means of thermistor 28 which is connected electrically, as shown in FIG. 2b, between ground and the junction of series resistor pair 149 and 150. These two resistors are connected in series with a third resistor 151 to form a voltage divider network between the negative operating voltage supply line 35 and ground, and produce the desired control voltage bias at the base of NPN transistor stage 152. The collector of the transistor stage 152 is connected to the junction of series resistors 153 and 154 also extending between ground and the negative supply voltage; whereas, the emitter of transistor stage 152 is connected to a voltage divider string comprising resistor 155, diode 156 and resistor 157. The transistor stage 152 and its associated circuitry just described operate as a bridge network wherein, when the ambient temperature of the spacecraft instrument package increases relative to the nominal level (e.g., 55°F), the resistance of the thermistor unit 28 decreases and results in a less negative base voltage level and therefore increased conduction by the transistor stage 152. As a result, the voltage at the emitter of transisotr stage 152 is also less negative and this signal is coupled through diode 156 and resistor 158 to the base of transistor stage 159 which, together with matched stage 160, forms a thermostat type switching circuit.

More specifically, the respective emitters of the transistor stages 159 and 160 are connected through common resistor 161 to the negative operating voltage; the base of the right-hand transistor 160 is supplied with a predetermined bias signal by means of voltage divider resistances 162 and 163; and, capacitor 164 is connected between the bases of transistor stages 159-160 to provide a low rolloff helpful in eliminating noise during the transition or switching interval for pair 159-160. The collector of the right-hand transistor stage 160 is connected to the positive operating voltage supply 39 through resistance 165 and is also connected to the base of the stage 159 through biasing resistor 167, while the collector of the left-hand stage 159 is connected via line 166, to the base of the shunting transistor 138 of FIG. 2b. As will be explained in detail shortly, the output voltage appearing at the collector of the right-hand stage 160 provides a digital indication to the spacecraft telemetry system concerning instrument panel temperature. The diode 168 facilitated this by clamping the collector voltage at say minus 0.6 volt minimum. In FIG. 2b it will be noted that the collector output signal voltage from transistor stage 160 is developed across resistors 168a and 168b and is applied as a control bit to the digital counter 23 over line 168c.

As mentioned previously, if the ambient temperature of the spacecraft instrument package increases above the desired level (e.g., 55°F), the voltage appearing at the base of the left-hand transistor stage 159 becomes less negative and thereby increases conduction at this half of the switching pair 159-160. The resulting output signal at the collector of stage 159 produces the proper voltage level needed at the base of the control or switching transistor stage 138 to turn transistor stage 138 on and thereby gate transistor stage 126 off. This, in turn, removes the drive signal from the output control line 132 to thereby effectively disconnect the internal shunt resistance 16, so that the current now available from the transistor 124 causes conduction of transistor stage 125 and thereby results in a drive signal for the external drive control lines 136-137. Accordingly, the excess solar cell energy is now shunted to the externally distributed resistance(s) 17 for dissipation. Obviously, the temperature value at which the excess solar cell energy is switched from the internal to the external distributed resistance, in order to provide this spacecraft temperature control, can be made adjustable if desired, for example, by utilizing a variable value resistance at 162.

Conversely, if the ambient temperature for the spacecraft instrument package drops below the desired level, the left-hand transistor stage 159 of the switching pair 159-160 turns off, thus rendering shunt transistor stage 138 non-conductive and thereby removing the clamp from transistor stage 126. The first available output current from transistor 124 will now pass through transistor stage 126 rather than 125, inasmuch as stage 126 conducts prior to stage 125 due to the offset diode 128, as previously mentioned. In one practical application of the present invention, there is approximately 2 milliamps of current drive out of transistor stage 126 prior to conduction of transistor stage 125 and this was found to be more than sufficient to insure saturation of the internal shunt amplifier circuitry (see FIG. 3) prior to external shunt activation.

The temperature function generating circuitry comprising transistor stage 152 is also utilized to provide a temperature offset for the voltage monitoring circuitry of FIG. 2a; i.e., transistor pair 96-97. More specifically, as the ambient temperature for the spacecraft instrument package increases, the less negative voltage level resulting at the base of the transistor stage 152 also appears at the base of a similar NPN transistor stage 169 whose emitter is connected to a negative operating voltage by means of a voltage divider comprising resistors 170 and 171, connected between the negative supply voltage and ground, and whose collector is connected by means of line 107 in FIGS. 2a and 2b to the base of the right-hand stage 97 of the differential amplifier pair 96-97.

Consequently, the temperature variations sensed by the thermistor 28 produce a corresponding variable voltage level at the collector of transistor stage 169 and the base of the transistor stage 97 which offsets the differential amplifier pair 96-97 accordingly. As the ambient temperature increases, for example, a more negative voltage level is applied to the base of the transistor stage 97, thus increasing conduction at this half of the differential amplifier pair and thereby also causing an increased conduction at the current amplifiers 101 and 102 (through diode 110 and along line 111) so that the external resistance shunt circuitry is rendered effective to shunt solar cell array energy away from the battery 11 at a maximum battery voltage somewhat lower than the voltage level that would otherwise be selected by the voltage monitoring circuitry; i.e., without this temperature offset. Conversely, as the internal spacecraft temperature sensed by the thermistor 28 decreases, less and less negative offset voltage would be applied to transistor stage 97, thereby delaying operation of the external shunt circuitry until a higher actual battery voltage occurs. In this manner, the maximum permitted voltage for the battery 11 is made to vary as a function of ambient battery temperature, thereby assuring more accurate and realistic control during battery charging and discharging operations.

The proper trickle current value to be applied to the battery 11 is also a function of battery temperature. In accordance with the present invention, therefore, the temperature function generating circuitry shown in FIG. 2b additionally controls the amount of the trickle current applied to the battery 11 once a fully charged condition is attained, as previously discussed. In particular, when the spacecraft battery 11 is in its fully charged condition, the reversible digital counter 23 (see FIG. 1) emits a suitable signal indicating this full charge condition, as represented in FIG. 1 by the control line 26. Referring now to the detailed circuitry of FIG. 2b, this full charge signal appears as a positive voltage level on input line 172 and is applied to the emitter of a PNP type transistor 173 whose base is grounded and whose emitter is connected, through resistor 174, to the negative supply voltage. The transistor stage 173 is therefore rendered conductive.

With transistor stage 173 turned on, the resulting voltage signal appearing at the collector of transistor stage 173 is applied, on the one hand, through diode 175 to the base of transistor stage 176 at base input resistor 177 and, on the other hand, through resistor 178 as a control signal to the gate element of the field effect transistor 179. As a result, transistor stage 176 turns on and thereby enables the negative output from the integrator (signifying a battery charging condition) which appears on line 180 in FIGS. 2a and 2b to drive current into the emitter of transistor 176, via resistor 181, and then through control transistor stages 124, 125 and 126, via control signal line 123a, to the appropriate shunt amplifiers (see FIG. 3 and the typical circuitry therefor). The system is thereby conditioned for supplying the proper amount of trickle charge to the battery 11, as will be discussed shortly. Operating voltage for the collector of transistor stage 176 (and stage 123) is supplied through resistor 182 connecting line 123a to supply line 39.

With the field effect transistor 179 rendered conductive; i.e., upon the battery reaching its fully charged state, a control signal is applied through the field effect transistor 179, resistor 183 and wire 184 between FIGS. 2a and 2b to the integrator input summing node at the base of the left-hand transistor stage 32 in the integrating differential amplifier pair 32–33. It will be noted in FIG. 2b that this control signal originates at the collector of transistor 152 in the temperature function generator circuitry, and has the effect of offsetting the integrator circuitry in accordance with the proper trickle charge current value for the battery 11, at the existing battery temperature. In other words, a null condition will occur when the actual charging current produces an input to the integrating circuitry just equal to this offset control signal from the temperature function generator and the control loop will again balance.

Referring to FIG. 2a, it will be noted that the drain/source terminals of field effect transistor 185 connect the inverting input terminal for the comparator operational amplifier 55 to ground. As a result, when the battery 11 is in its fully charged condition; i.e., signal at input 172 in FIG. 2b, the resulting voltage level produced at the collector of transistor stage 173 is applied to the gate terminal of field effect transistor 185, over line 186 and through resistor 187, and the inverting input terminal for the comparator 55 is thereby shorted to ground. If the solar cell array 10 should thereafter produce more current than the shunting circuits can handle and the battery 11 thus charges at greater than the preset trickle rate previously mentioned, counting cannot occur at the counter 23 and a continuous maximum load will be applied to the solar cell array 10 by the shunts. Otherwise, pulsing would occur on the shunts and a type of very slow oscillation and high current peaks into the battery 11 might be initiated. It should be noted here that preferably the digital accumulator or counter 23 would be provided with an independently operated interlock (not shown) to refuse charging count pulses from the charge quantizer circuitry after a full charge condition has been reached so that the counter 23 cannot spill over; i.e., automatically return to a zero or no count condition, and suddenly announce an empty battery condition. Moreover, suitable provision could be made, if desired, to automatically set the counter 23 to a full charge count condition when the system of the present invention is initially turned on.

In should also be noted at this time that, if desired, the temperature dependent offset signal applied to the voltage monitoring circuitry over line 107, from transistor stage 169 in FIG. 2b, can be varied by proper tailoring of the resistor values 170 and 171. Similarly, the trickle offset control can be tailored, for example, by proper adjustment of the resistor 153 applied, over line 184, to the integrator input connected between ground and the collector of the transistor stage 152.

Various other modifications, adaptations and alterations are of course possible in light of the above teachings. Therefore, it should be understood at this time that within the scope of the appended claims the invention may be practiced otherwise than as specifically described.

What is claimed is:

1. In combination with spacecraft electrical power system including a spacecraft, a battery aboard said spacecraft, charging source means for supplying charging current to said battery, and an electrical load for drawing discharge current from said battery, a first resistance means disposed internal to said spacecraft, a second resistance means disposed external to said spacecraft, each of said first and second resistance means being connected electrically to said charging source means in circuit multiple with said battery and being effective when supplied with energy in the form of current from said charging source means to dissipate said energy as heat, means for measuring the internal temperature of said spacecraft, and shunt control means responsive to said temperature measuring means for selectively energizing said first and second resistance means with current from said charging source means to maintain a substantially constant temperature internal to said spacecraft.

2. The combination specified in claim 1 wherein, said battery is mounted internal to said spacecraft, said charging source means is a solar cell array, and said temperature measuring means is a thermistor disposed adjacent said battery.

3. The combination specified in claim 2 further including, means responsive to the charging and discharging current to and from said battery for producing a first signal proportional to the magnitude of said charging and discharging current, means responsive to said first signal for producing an output signal pulse demarcating each time said battery has either been charged or discharged by a predetermined amount of electrical charge, a reversible digital counter operably connected to receive and register a count of the output signal pulses produced by said pulse producing means, control means effective when said battery is being charged to cause said reversible digital counter to count in a first direction and effective when said battery is being discharged to cause said reversible digital counter to count in a second opposite direction, whereby the count registered by said digital counter is continuously indicative of the state of charge and discharge of said battery, means for monitoring the voltage existing across said battery relative to a predetermined desired battery voltage value, and means for monitoring the charging current being supplied to said battery relative to a predetermined desired maximum charging current value, said shunt control means being responsive to said battery voltage and charging current monitoring means for selectively energizing said first and second resistance means with current from said charging source means when said battery voltage exceeds said desired voltage value and when said charging current exceeds said desired maximum value.

4. The combination specified in claim 18, wherein, said output signal pulse producing means includes a finite time integrator circuit means for integrating the charge and discharge current of said battery and producing an output signal pulse of one polarity each time said battery has been charged by said predetermined amount and an output signal pulse of opposite polarity each time said battery has been discharged by said predetermined amount, and said control means includes circuit means responsive to the polarity of the output signal pulse produced by said finite time integrator circuit means for supplying a control signal to said digital counter effective to control the counting direction of said digital counter means.

5. The system specified in claim 4 further including trickle charge control means rendered effective when said battery is fully charged to supply an offset control signal to said integrator means effective to offset the operating state of said integrator means and cause the charging current supplied to said battery to be reduced to a selected trickle charge level.

6. The system specified in claim 3 further including trickle charge control means rendered effective when said battery is in a fully charged condition for reducing the charging current being applied to said battery by said charging source means to a selected trickle charge current level.

7. The system specified in claim 6 wherein said selected trickle charge current level is dependent upon the temperature measured by said thermistor.

8. The system specified in claim 3 further including efficiency offset means operably connected to said output signal pulse producing means and render effective when said battery is being charged to adjust each output signal pulse then produced to account for inefficiency of the battery during charging.

9. The system specified in claim 4 further including efficiency offset means rendered effective when said battery is being charged to offset said finite time integrator circuit means for adjusting each output signal pulse then produced by said integrator circuit means to account for battery inefficiency during charging.

* * * * *